United States Patent
Tanaka et al.

(10) Patent No.: US 10,921,214 B2
(45) Date of Patent: Feb. 16, 2021

(54) GAS SENSOR CONTROLLER

(71) Applicant: DENSO CORPORATION, Kariya (JP)

(72) Inventors: Nobuyuki Tanaka, Kariya (JP); Hiroki Kakui, Kariya (JP); Yuji Iwama, Kariya (JP); Satoshi Nishimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 301 days.

(21) Appl. No.: 16/016,811

(22) Filed: Jun. 25, 2018

(65) Prior Publication Data
US 2019/0017901 A1    Jan. 17, 2019

(30) Foreign Application Priority Data
Jul. 11, 2017    (JP) .................. 2017-135434

(51) Int. Cl.
*G01M 15/10*    (2006.01)
*G01M 13/00*    (2019.01)

(52) U.S. Cl.
CPC .......... *G01M 15/102* (2013.01); *G01M 13/00* (2013.01)

(58) Field of Classification Search
None
See application file for complete search history.

(56) References Cited

U.S. PATENT DOCUMENTS

2016/0226240 A1*   8/2016   Saito .................. G01N 27/4065

FOREIGN PATENT DOCUMENTS

JP    2016-090462 A    5/2016

\* cited by examiner

*Primary Examiner* — Douglas X Rodriguez
(74) *Attorney, Agent, or Firm* — Posz Law Group, PLC

(57) ABSTRACT

An air-fuel ratio (A/F) sensor control device includes: an impedance detector detecting an impedance of an A/F sensor; and a pump current controller performing a digital control on a supply of electric current to the A/F sensor. The pump current controller includes a PID calculator calculating an instruction current value according to a difference of two input values, i.e., the difference between a PID control target value and a detection value of an inter-terminal voltage of a Nernst cell; and a protection clamper limiting a supply of electric current to a pump cell based on the instruction current value and the impedance. The protection clamper includes: a current clamp threshold calculator calculating an upper limit value and a lower limit value of the electric current based on the impedance of the Nernst cell, a first current value limiter limiting the instruction current value by the upper limit value and the lower limit value, and a second current value limiter performing a constant current limitation on an instruction current limit value by using an instruction constant current value.

8 Claims, 16 Drawing Sheets

GAS SENSOR CONTROLLER

CROSS REFERENCE TO RELATED APPLICATION

The present application is based on and claims the benefit of priority of Japanese Patent Application No. 2017-135434, filed on Jul. 11, 2017, the disclosure of which is incorporated herein by reference.

TECHNICAL FIELD

The present disclosure generally relates to a gas sensor controller that controls a gas sensor for detecting a gas component in an exhaust gas from an internal-combustion engine.

BACKGROUND INFORMATION

Conventionally, the gas sensor, e.g., an air-fuel ratio (A/F) sensor, is used to detect an excess air rate in the exhaust gas from the internal-combustion engine as disclosed in Patent document 1, i.e., Japanese Patent No. 2016-142598. The technique disclosed in patent document 1 uses a sensor impedance calculator to calculate a sensor impedance by receiving an input of a detection value of a detector cell, and a limit value calculator calculates a limit value of an application voltage to be applied to a pump cell. In such case, an upper limit value and a lower limit value of a voltage limitation are calculated respectively as Vo_pclamp and Vo_mclamp.

With the technique disclosed in patent document 1, the A/F sensors have a tendency to be activated at a low impedance, which leads to an insufficient limitation that is imposed in the above-described manner. Therefore, the conventional A/F sensors and the low-impedance activatable A/F sensors need to be controlled altogether by a controller that is capable of accommodating control of various types of sensors.

SUMMARY

It is an object of the present disclosure to provide a gas sensor controller that is capable of protecting a sensor during a normal operation time while accommodating control of various types of sensors.

In an aspect of the present disclosure, a gas sensor controller for controlling a gas sensor includes a first cell for substantively detecting a state of a gas in an exhaust gas of an internal-combustion engine, and a second cell that is electrically connected to the first cell. According to this aspect of the present disclosure, an impedance detector detects an impedance of the gas sensor that detects the state of the gas in the exhaust gas of the internal-combustion engine, and a current supply controller performs a digital control on a supply of electric current to the gas sensor.

The current supply controller includes a calculator and a first cell current controller (i.e., a pump current controller). The calculator calculates an instruction current value according to a difference of two input values, i.e., by calculating (i) the difference between a control target value and (ii) a detection value of an inter-terminal voltage of the second cell. The first cell current controller limits a supply of electric current to the first cell of the gas sensor based on the instruction current value calculated by the calculator and the impedance detected by the impedance detector.

The first cell current controller uses a current clamp threshold calculator to calculate an upper limit value and a lower limit value of the electric current based on an impedance of a Nernst cell, and a current value limiter to limit the instruction current value calculated by the calculator within a range of the upper/lower limit values calculated by the current clamp threshold calculator. In such case, the limit values are insufficient in a low impedance range when they are applied to a gas sensor that is activated at a low impedance. Therefore, according to this aspect of the present disclosure, before or after limiting the electric current by the upper/lower limit values calculated by the current clamp threshold calculator, the current value limiter performs a constant current limitation according to an instruction constant current value.

Therefore, even when the limit values calculated by the current clamp threshold calculator are insufficient depending on the sensor type of the gas sensor, the instruction constant current value is used to limit the electric current to a constant value, i.e., to enable a constant current limitation, and thereby enabling protection of the gas sensor during a normal operation time while accommodating control of various types of sensors.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
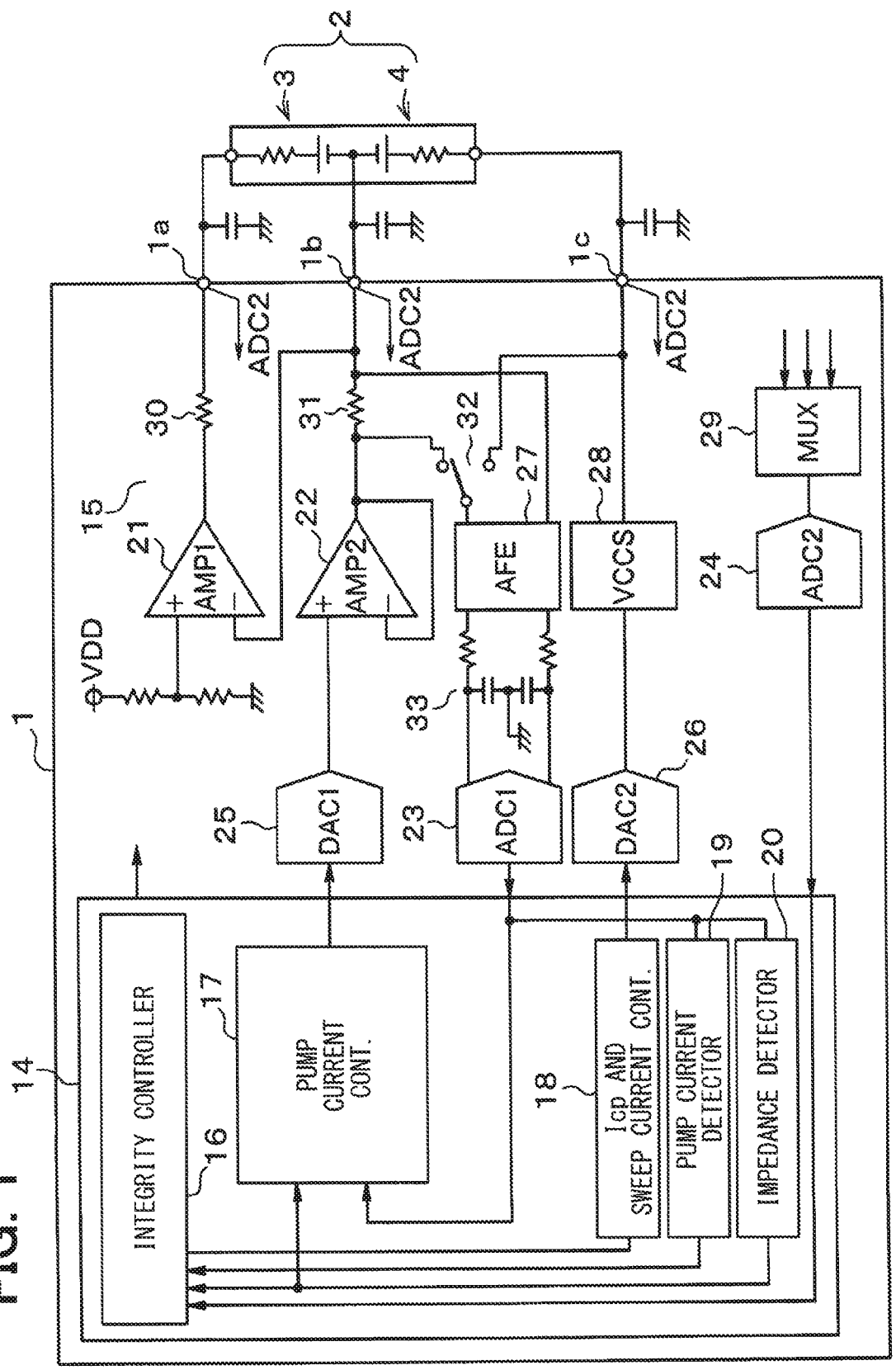
FIG. 1 is a block diagram of a configuration of an air-fuel ratio (A/F) sensor controller in all embodiments of the present disclosure.

Hereafter, embodiments of a gas sensor control device are described. In the following embodiments, the same function/component has the same reference numeral in each of the embodiments, and the description of the same function/component in the subsequent embodiments may be omitted.

First Embodiment

FIG. 1 to FIG. 13 show exemplifying diagrams and views of the first embodiment of the present disclosure. FIG. 1 shows a schematic configuration of an A/F (Air/Fuel ratio) sensor control device 1, which serves as a gas sensor controller. The A/F sensor control device 1 controls an A/F sensor 2 for performing various controls, for example, for determining an air-fuel ratio in the exhaust gas from an internal-combustion engine (not illustrated).

The A/F sensor 2 is a two-cell type sensor and is provided with (i) a pump cell 3, which serves as a sensor cell that substantively detects a state of a gas in the exhaust gas from the internal combustion engine, and (ii) a Nernst cell 4. The pump cell 3 corresponds to a first cell, and the Nernst cell 4 corresponds to a second cell. First, with reference to FIG. 2, an example structure of the two-cell type A/F sensor 2 is described.

Figure 2:
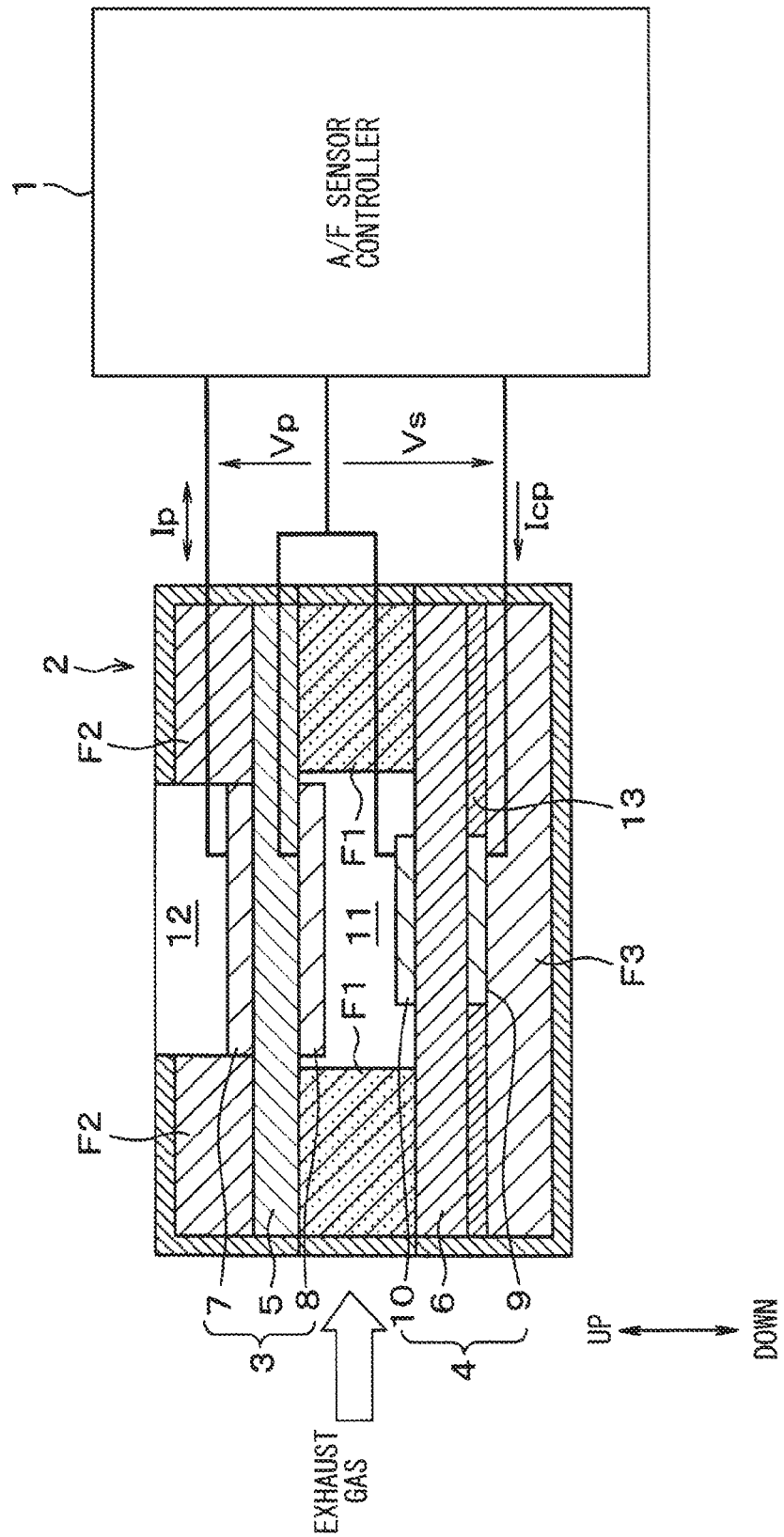
FIG. 2 is a vertical cross section of a main part of the A/F sensor.

Although, for illustration purposes, an upside or upper side of the drawing in FIG. 2 is defined as "UP" and a downside or lower side of the drawing in FIG. 2 is defined as "DOWN," the positioning and/or orientation of the sensor 2 may be defined differently and not limited to the orientation shown in FIG. 2.

The A/F sensor 2 is provided with two solid electrolyte layers 5 and 6 separated from each other, with a gap interposed between the layers 5 and 6. A pair of electrodes 7 and 8 are included on one of the two layers 5 and 6, i.e., layer 5 in this case, serving as the pump cell 3. Another pair of electrodes 9 and 10 are included on the other layer 6, serving as the Nernst cell 4.

The electrodes 8 and 10 in the cells 3 and 4 are so arranged that their surfaces are respectively exposed to an exhaust gas detection chamber 11.

At a position between the two solid electrolyte layers 5 and 6, a gas diffusion porous layer F1 is disposed, i.e., is bound by the layers 5 and 6. These solid electrolyte layers 5 and 6 and the gas diffusion porous layer F1 are arranged to define a somewhat closed space, which serves as the exhaust gas detection chamber 11. The exhaust gas is introduced into the exhaust gas detection chamber 11 through the gas diffusion porous layer F1.

On an upper side surface of the solid electrolyte layer 5, a ceramic layer F2 is formed with alumina etc., for example, and, the electrode 7 is arranged next to, i.e., adjacent to, the ceramic layer F2. The electrode 7 has its surface partially contacting the surface of the solid electrolyte layer 5, and also has its surface partially exposed to an aerated layer 12.

Further, on an underside of the solid electrolyte layer 6, a ceramic layer F3 is formed with alumina, etc., for example, and an oxygen reference chamber 13 is defined at a position between the ceramic layer F3 and the solid electrolyte layer 6. The oxygen reference chamber 13 is used to define a standard oxygen density. A part of the electrode 9 is in contact with the solid electrolyte layer 6, and another part of the electrode 9 is in contact with the oxygen reference chamber 13.

For operating the Nernst cell 4 as an oxygen (O2) sensor, oxygen is supplied to the oxygen reference chamber 13 as a reference. More practically, a micro current Icp flowing from the electrode 9 to the electrode 10 causes oxygen to be pumped from the exhaust gas detection chamber 11. Oxygen ions are incorporated into the Vs+ electrode 10 when the micro current Icp is supplied, which enables the Nernst cell 4 to function as an oxygen sensor. The Nernst cell 4 outputs a voltage Vs based on the atmosphere (e.g., air/fuel ratio) of the exhaust gas detection chamber 11.

In such an environment, when the exhaust gas is introduced into the exhaust gas detection chamber 11 through the gas diffusion porous layer F1, the Nernst cell 4 causes the electromotive force Vs according to the introduced exhaust gas, and, based on a comparison result from a comparison between the electromotive force Vs and a reference voltage (e.g., 0.45 [V]), an electric current Ip is supplied to the pump cell 3 for the intake/discharge of oxygen to/from the exhaust gas detection chamber 11. When the air inside of the detection chamber 11 comes close to a stoichiometric level the voltage Vs is controlled to move toward the reference voltage. Further, according to the electric current Ip controlled by this reference voltage (e.g., 0.45 V), the calculation of an air-fuel ratio is enabled.

Note that the electrodes 8 and 10 are electrically connected to each other, and are electrically connected to the A/F sensor control device 1. Further, the other electrodes 7 and 9 are also electrically connected to the A/F sensor control device 1.

Figure 3:
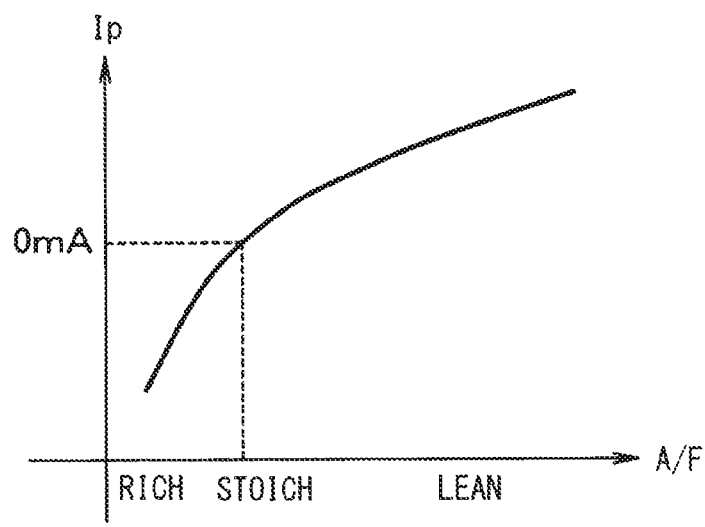
FIG. 3 is a graph illustrating a relationship between an air-fuel ratio and a pump current.

The relationship between the atmosphere (i.e., air-fuel ratio) of the exhaust gas and the electric current Ip of the pump cell 3 is shown in FIG. 3. As shown in FIG. 3, the electric current Ip falls down to a negative value when the air-fuel ratio of the exhaust gas shifts toward a rich side, and the electric current Ip rises to a positive value when the air-fuel ratio shifts toward a lean side. The electric current Ip becomes equal to 0 mA when the air-fuel ratio is at a stoichiometric level. That is, the change (i.e., increase/decrease) in the electric current Ip of the A/F sensor 2 corresponds to the change in the air-fuel ratio, i.e., the "lean" air-fuel ratio increases the electric current Ip, and the "rich" air-fuel ratio decreases the electric current Ip. A stoichiometric level may be an air-fuel ratio where exactly enough air is provided to completely burn all of the fuel. Ratios lower than the stoichiometric level may be considered rich where ratios higher than the stoichiometric level may be considered lean.

Figure 4:
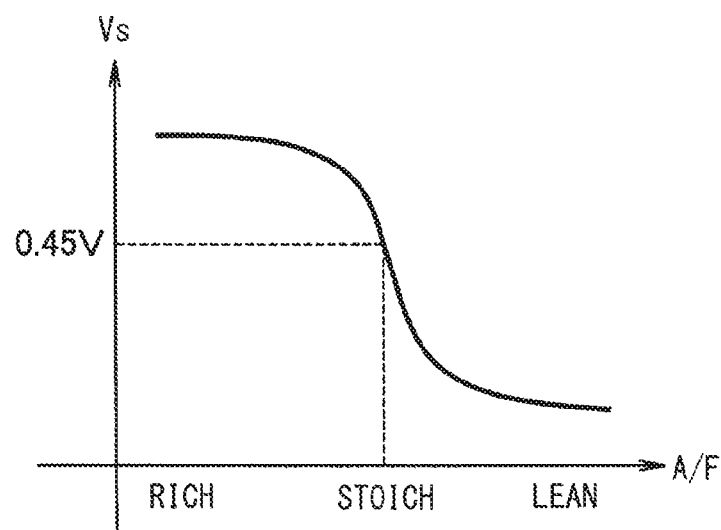
FIG. 4 is a graph illustrating a relationship between the air-fuel ratio and an inter-terminal voltage of a second cell.

The relationship between the atmosphere (i.e., air-fuel ratio) of the exhaust gas and the detected voltage Vs of the Nernst cell 4 is shown in FIG. 4. As shown in FIG. 4, when the air-fuel ratio of exhaust gas becomes rich, the voltage Vs rises, and, when it becomes lean, the voltage Vs falls. When the air-fuel ratio is at a stoichiometric level, the voltage Vs of the Nernst cell 4 is adjusted to a predetermined value (e.g., 0.45 V).

Further, at a proximity of the stoichiometric level, the voltage Vs is characterized by changing more steeply (i.e., slope) compared with other air-fuel ratio levels. Thus, when the A/F sensor control device 1 detects the voltage Vs of the Nernst cell 4 at a proximity of the stoichiometric level, a small change of the air-fuel ratio is detectable. In view of such characteristics, the pump cell 3 and the Nernst cell 4 may be shown, as illustrated in FIG. 1, as a series connection of a resistance component and an electromotive force (i.e., voltage) component.

As shown in FIG. 1, terminals (i.e., a pair of electrodes 7 and 8, as shown in FIG. 2) of the pump cell 3 are connected to a terminal 1a and a terminal 1b of the A/F sensor control device 1. Terminals (i.e., a pair of electrodes 9 and 10, as shown in FIG. 2) of the Nernst cell 4 are connected to a terminal 1c and the terminal 1b of the A/F sensor control device 1. Note that the pump cell 3 and the Nernst cell 4 are put into a non-activated state when the temperature T is low, and are put into an activated state when the temperature T rises above a preset temperature (e.g., 700° C. or above). Further, as for the pump cell 3, an impedance ZIp becomes high (e.g., about several kΩ) when the temperature T is low, and the impedance ZIp becomes low (e.g., about 50Ω) when the temperature T is high.

The A/F sensor control device 1 includes a digital circuit part 14 and an analog circuit part 15. The digital circuit part 14 may have, for example, a digital signal processor (DSP) (not shown), and be divided into the following parts, e.g., an integrity controller 16, a pump current controller (i.e., a current supply controller) 17, an Icp and sweep current controller (abbreviated herein as "a sweep current controller") 18, a pump current detector 19, and an impedance detector 20. The digital circuit part 14 may perform various kinds of digital control.

The integrity controller 16 receives various inputs of an impedance detection result of the impedance detector 20, a detection result of the current Ip of the pump current detector 19, and a voltage of each of the terminals 1a-1c, and performs various controls, such as outputting a switching control signal to a multiplexer 29 and a switch 32, which are described later.

On the other hand, the analog circuit part 15 includes operational amplifiers 21 and 22, A/D converters 23 and 24, D/A converters 25 and 26, an analog front end (AFE) 27, a voltage-controlled current source (VCCS) 28, and a multiplexer 29. The analog circuit part 15 may also include a current limiting resistor 30, a current sensing resistor 31 of about 150Ω, the switch 32 for a voltage detection switching, and an anti-aliasing filter (AAF) 33.

The reference voltage of fixed value (e.g., VDD/2) is input to a non-inverted input terminal of the operational amplifier 21 and an inverted input terminal of the amplifier 21 is connected to the terminal 1b, for a configuration of controlling the voltage of the terminal 1b to have the reference voltage (e.g., VDD/2) based on the imaginary-short operation.

The output of the operational amplifier 21 is applied to one terminal (e.g., the electrode 7 shown in FIG. 2) of the pump cell 3 via the current limiting resistor 30 and the terminal 1a. Since the current limiting resistor 30 is used to limit the electric current at a terminal abnormal time, the value and size of the resistor 30 are determined according to design, i.e., based on a tolerance of a protection function.

Further, the pump current controller 17 outputs a digital current control value for controlling the electric current which flows to the pump cell 3. The internal configuration of the pump current controller 17 is described later. A D/A converter 25 receives an input of this digital current control value, and converts it into an analog voltage. The operational amplifier 22 serves as a voltage buffer, and applies the output analog voltage of the D/A converter 25 to the other terminal of the pump cell 3 and to one terminal of the Nernst cell 4 (e.g., to the electrodes 8 and 10 shown in FIG. 2) via the current sensing resistor 31 and the terminal 1b.

The switch 32 is provided for switching between the inter-terminal voltage of the current sensing resistor 31 and the inter-electrode voltage of the Nernst cell 4, for selectively inputting those voltages to the terminal of the analog front end 27. The switch 32 is controlled, i.e., switched, by the integrity controller 16 of the digital circuit part 14, by receiving a switching control signal from the integrity controller 16. Thus, either the inter-terminal voltage of the current sensing resistor 31 or the inter-electrode voltage of the Nernst cell 4 is input to the analog front end 27.

The analog front end 27 is provided with an amplifier, for example, and outputs a waveform-rectified analog voltage to the A/D converter 23 via the anti-aliasing filter 33. The A/D converter 23 performs A/D-conversion processing of the analog voltage that is input via the anti-aliasing filter 33, and provides an output to the digital circuit part 14. The digital circuit part 14 can use the pump current detector 19 to detect the electric current flowing in the current sensing resistor 31 as the pump current Ip, according to a switch control of the switch 32 by the integrity controller 16 for obtaining the inter-terminal voltage of the current sensing resistor 31.

On the other hand, the sweep current controller 18 is configured to control a supply of electric current to the Nernst cell 4 by using the voltage-controlled current source 28, which supplies a positive electric current or a negative electric current to the Nernst cell 4. The sweep current controller 18 outputs, to the D/A converter 26, a digital current control value for controlling the supply of electric current. The D/A converter 26 receives an input of the digital current control value, converts it into an analog voltage, and outputs the converted analog voltage to the voltage-controlled current source 28.

The voltage-controlled current source 28 applies the analog voltage to the other terminal of the Nernst cell 4 (e.g., the electrode 9 of FIG. 2) via the terminal 1c as a control signal. In such manner, the electric current (i.e., Icp and the sweep current for sensor impedance detection) to the Nernst cell 4 can be controlled.

When performing such control, in association with a switching control of the switch 32 for obtaining the inter-terminal voltage of the Nernst cell 4 by the integrity controller 16, the digital circuit part 14 obtains a digital output value of the A/D converter 23 at the time of supplying the sweep current, and the impedance detector 20 detects an impedance Zac according to such value. Details of such operation are described later.

Further, the voltage of each of the terminals 1a-1c is input to the multiplexer 29, and the integrity controller 16 is configured to selectively switch and obtain the voltage of each of these terminals 1a-1c. The integrity controller 16 controls the multiplexer 29 by outputting the selective switching control signal to the multiplexer 29, to select a signal from among the input signals to the multiplexer 29, and the selected signal is output from the multiplexer 29 to the A/D converter 24. The A/D converter 24 performs analog-to-digital conversion processing of the selected signal, and provides output to the digital circuit part 14. Thereby, the digital circuit part 14 can obtain the voltage of each of these terminals 1a-1c. The voltage obtained in such manner may be used for the abnormality detection of the terminals 1a-1c, which is not discussed here in detail.

Figure 5:
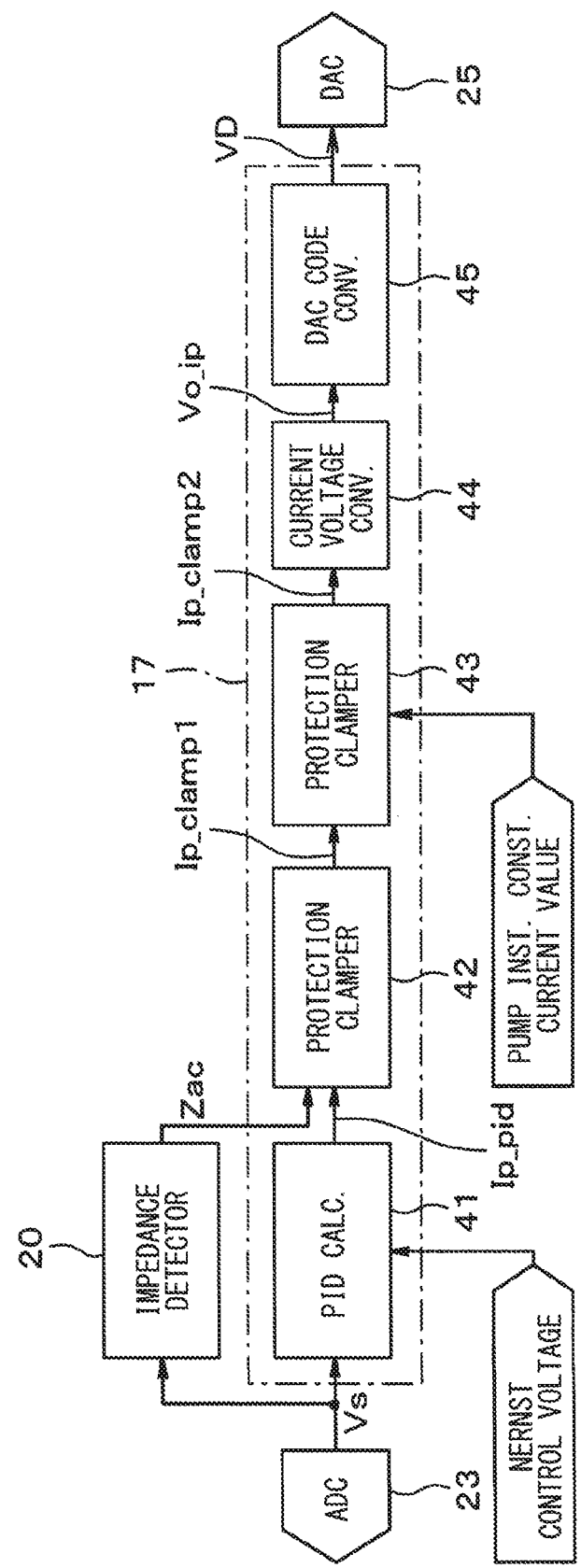
FIG. 5 is a block diagram of a configuration of a pump current controller.

The internal function of the pump current controller 17 is explained with reference to FIG. 5. As shown in FIG. 5, the pump current controller 17 includes a cascaded connection of a PID calculator 41, protection clampers 42 and 43, a current voltage converter 44, and a DAC code converter 45. The PID calculator 41 receives an input of a Nernst control voltage (i.e., a PID control target value), and also receives an input of a voltage Vs between the terminals of the Nernst cell 4 (i.e., an inter-terminal voltage Vs) from the A/D converter 23. The PID calculator 41 calculates the difference of the two input voltages and calculates an instruction current value Ip_pid according to the difference. Note that the Nernst control voltage may be input from (i) a microcomputer that is externally connected to the digital circuit part 14 or (ii) a storage (not illustrated) such as a flash memory that is either externally or internally connected to the digital circuit part 14.

The protection clampers 42 and 43 respectively serve as a pump current controller that limits a supply of electric current to the pump cell 3 of the A/F sensor 2 based on (i) the instruction current value Ip_pid calculated by the PID calculator 41 and (ii) the impedance Zac of the Nernst cell 4 detected by the impedance detector 20.

<Explanation of the Protection Clamper 42 (i.e., a First Current Value Limiter)>

Figure 6:
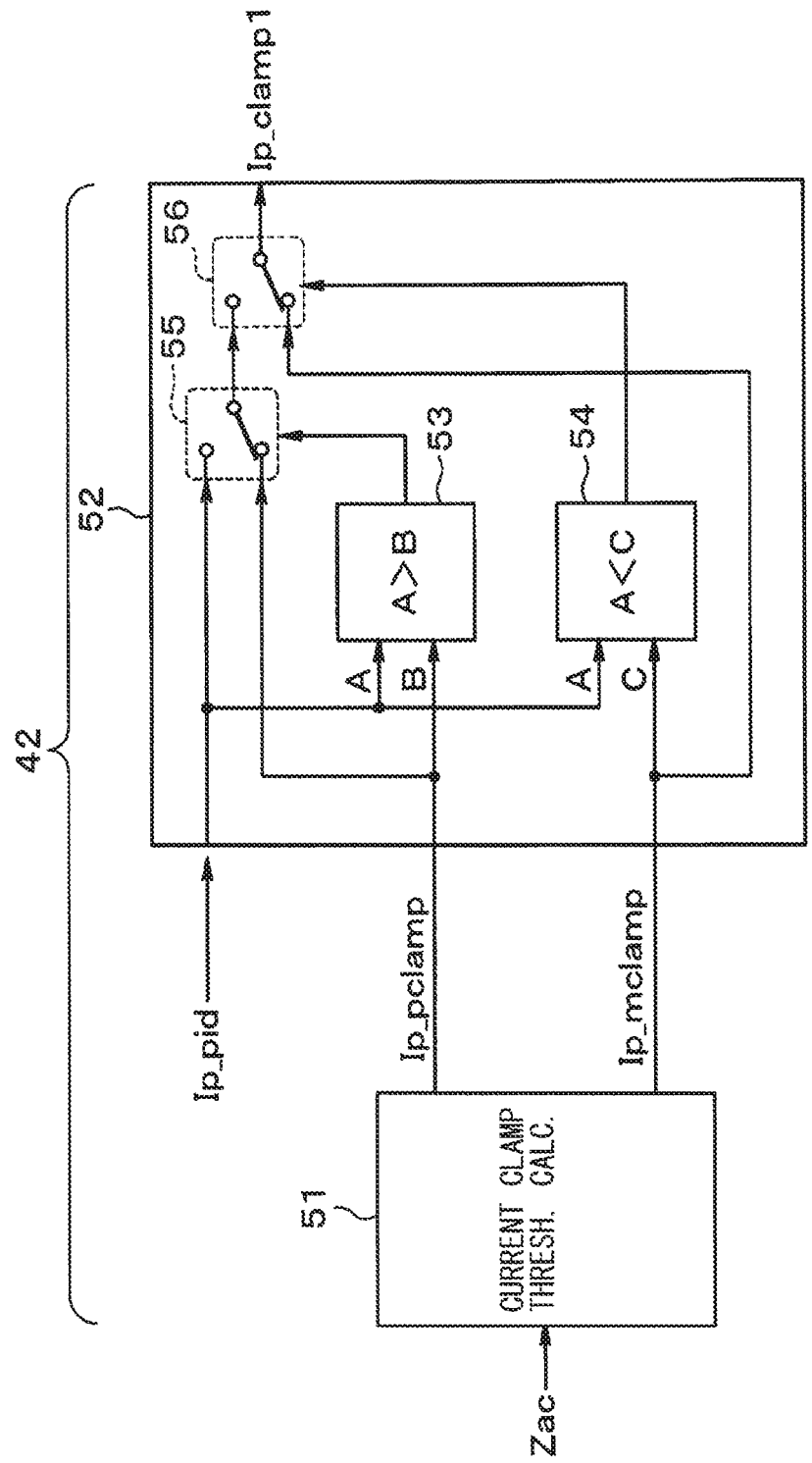
FIG. 6 is a block diagram of a configuration of a first protection clamper.

Specifically, the protection clamper 42 operates as a first current value limiter, which limits the instruction current value Ip_pid, and it is configured, for example, as shown in FIG. 6. That is, the protection clamper 42 includes (i) a current clamp threshold calculator 51 in which an upper limit value Ip_pclamp and a lower limit value Ip_mclamp of the electric current are calculated based on the impedance Zac of the Nernst cell 4, and (ii) a comparator 52 which compares the calculated values, i.e., the upper limit value Ip_pclamp and the lower limit value Ip_mclamp, with the instruction current value Ip_pid, as shown in FIG. 6. The comparator 52 is provided with an upper limit comparator 53, a lower limit comparator 54, and switches 55 and 56. The current clamp threshold calculator 51 calculates the upper limit value Ip_pclamp and the lower limit value Ip_mclamp, as shown in the following.

<Calculation Method of the Upper Limit Value Ip_pclamp and the Lower Limit Value Ip_mclamp>

Based on the circuit configuration shown in FIG. 1 of the present embodiment, the application voltage to the pump cell 3 is calculated in the following manner.

By designating an impedance of the pump cell 3 as ZIp, an impedance of the Nernst cell 4 as Zac, an electric current supplied to the pump cell 3 as Ip, and an electric current flowing through a series circuit of the pump cell 3 and the Nernst cell 4 as ΔI (maximum≈0.001 Å), the application voltage VIp to the pump cell 3 is represented as, $$VIp=(Ip+\Delta I)\times ZIp \quad \text{Equation (1)}$$

On the other hand, by designating a resistance of the current sensing resistor 31 as Rsh, and an output voltage of the operational amplifier 22 as Vo, the electric current Ip is represented as, due to the constant voltage 0.5×VDD of the input to the inverted input terminal of the operational amplifier 21 in a stable state, $$Ip=(0.5\times VDD-Vo)/Rsh \quad \text{Equation (2)}$$

If equations (1) and (2) are rearranged, the following equation is derived.

$$VIp=((0.5\times VDD-Vo)/Rsh+\Delta I)\times ZIp \quad \text{Equation (3)}$$

When equation (1) is solved for Ip, $$Ip=VIp/ZIp-\Delta I \quad \text{Equation (4)}$$

Now, if it is assumed that the impedance ZIp of the pump cell 3 has a relationship with the impedance Zac of the Nernst cell 4, e.g., the impedance Zac of the Nernst cell 4 is equal to the impedance ZIp of the pump cell 3 (i.e., ZIp=Zac), the electric current Ip can be represented as a function of the impedance Zac based on equation (4). If the voltage VIp is limited to be within a range of the upper and lower limit voltages (−Vclamp, +Vclamp), the upper limit value Ip_pclamp and the lower limit value Ip_mclamp of the instruction current value can be represented by the following equations (5) and (6) according to the limit voltage range described above and the function of the impedance Zac of the Nernst cell 4.

$$Ip\_p\text{clamp}=+V\text{clamp}/Zac-\Delta I \quad \text{Equation (5)}$$

$$Ip\_m\text{clamp}=-V\text{clamp}/Zac-\Delta I \quad \text{Equation (6)}$$

Thus, the current clamp threshold calculator 51 can calculate the upper limit value Ip_pclamp and the lower limit value Ip_mclamp respectively as a limitation value. The changes of the upper limit value Ip_pclamp and the lower limit value Ip_mclamp of the instruction current value represented by the equations (5) and (6) are shown in FIG. 7.

Figure 7:
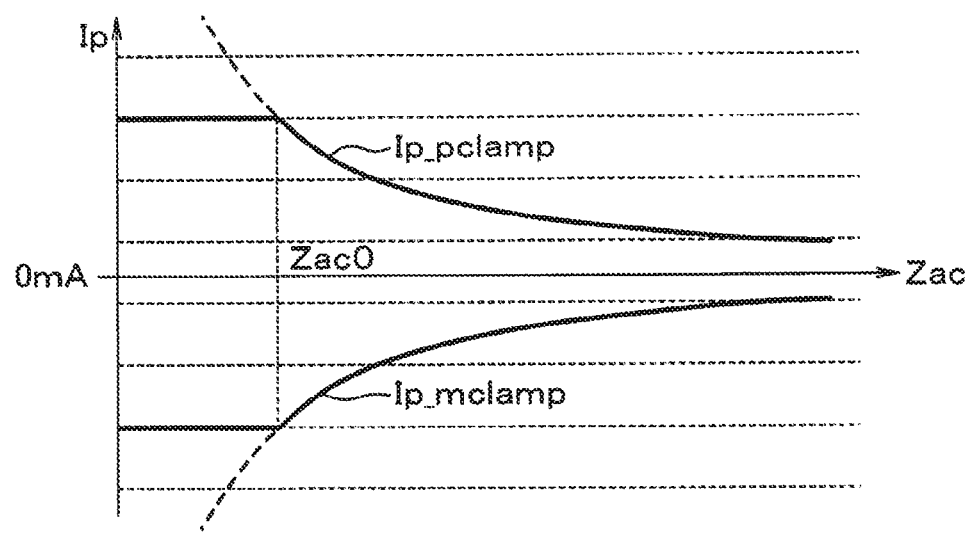
FIG. 7 is a graph illustrating a current limit value against an impedance of the second cell.

The equations (5) and (6) respectively serve as a function, which is inversely proportional to the impedance Zac, i.e., when the impedance Zac is small, the function takes a value approaching either positive or negative infinity, as shown by the dashed line part of Ip_pclamp and Ip_mclamp in FIG. 7. However, since the D/A converter 26 and the operational amplifier 22 both operate by receiving a supply of the power VDD from a non-illustrated power supply circuit, the current supply capability of the D/A converter 26 and the operational amplifier 22 is limited.

Therefore, in consideration of the output voltage range of the D/A converter 26 and the operational amplifier 22, even when the upper limit value Ip_pclamp and the lower limit value Ip_mclamp become large, the current clamp threshold calculator 51 sets a fixed value according to the output current characteristics of the D/A converter 26 and the operational amplifier 22 as the upper limit value Ip_pclamp/ the lower limit value Ip_mclamp, when the impedance Zac is lower than a predetermined impedance Zac0.

Note that, as shown in FIG. 7, in a predetermined impedance range of equal to or greater than Zac0, the upper limit value Ip_pclamp steadily decreases, and the lower limit value Ip_mclamp steadily increases.

The upper limit comparator 53 compares the instruction current value Ip_pid with the upper limit value Ip_pclamp, and, when the instruction current value Ip_pid exceeds the upper limit value Ip_pclamp, switches the switch 55 to limit Ip_pid to the upper limit value Ip_pclamp, and outputs this value as a first instruction current limit value Ip_clamp1.

The lower limit comparator 54 compares the instruction current value Ip_pid with the lower limit value Ip_mclamp, and, when the instruction current value Ip_pid is lower than the lower limit value Ip_mclamp, switches the switch 56 to limit Ip_pid to the lower limit value Ip_mclamp, and outputs this value as the first instruction current limit value Ip_clamp1.

Thereby, the first instruction current limit value Ip_clamp1 is output as a value within a range that is defined by the upper limit value Ip_pclamp and the lower limit value Ip_mclamp.

<Explanation of the Protection Clamper 43 (i.e., a Second Current Value Limiter)>

The A/F sensor 2 may vary in terms of at what impedance the sensor 2 is activated depending on the sensor types of the sensor 2. That is, some sensors may be activated at high impedance, while other sensors may be activated at low impedance. Thus, the current limiting operation for the low-impedance activated A/F sensors 2 by only the protection clamper 42 may not work, i.e., may be insufficient in the low impedance range. Therefore, in the present embodiment, the protection clamper 42 is supplemented by the protection clamper 43 for performing constant current limitation. That is, in the pump current controller 17 the protection clamper 42 may operate as a first stage current limiting device while the protection clamper 43 may operate as a second stage current limiting device.

Figure 8:
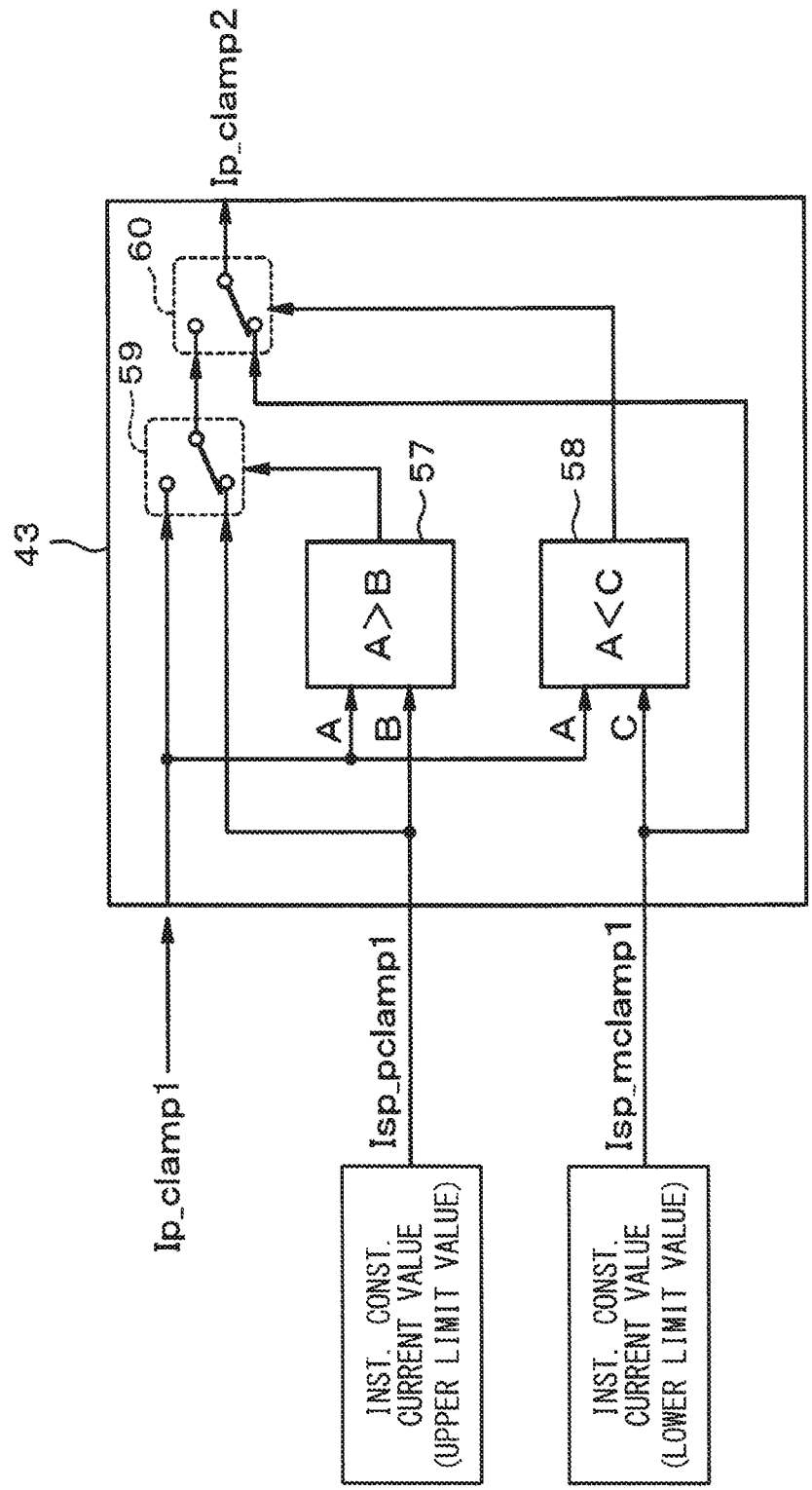
FIG. 8 is a block diagram of a configuration of a second protection clamper.

The protection clamper 43 operates as the second current value limiter, which limits the first instruction current limit value Ip_clamp1, and it is configured, for example, as shown in FIG. 8. That is, the protection clamper 43, which receives an input of a pump instruction constant current value (i.e., the instruction constant current values (e.g., the upper limit value Isp_pclamp1 and the lower limit value Isp_mclamp1)), includes (i) an upper limit comparator 57 that compares such input (e.g., the upper limit value Isp_pclamp1) with the first instruction current limit value Ip_clamp1 output by the first stage protection clamper 42, (ii) a lower limit comparator 58 that compares such input (e.g., the lower limit value Isp_mclamp1) with the first instruction current limit value Ip_clamp1 output by the first stage protection clamper 42, together with switches 59 and 60 which respectively switch an instruction current limit value Ip_clamp2 according to the outputs of the upper limit comparator 57 and the lower limit comparator 58.

Note that the pump instruction constant current values (i.e., the instruction constant current values (=the upper limit value Isp_pclamp1 and the lower limit value Isp_mclamp1)) may be input from (i) a microcomputer that is externally connected to the digital circuit part 14 or (ii) a storage (not illustrated) such as a flash memory that is either externally or internally connected to the digital circuit part 14.

Figure 9:
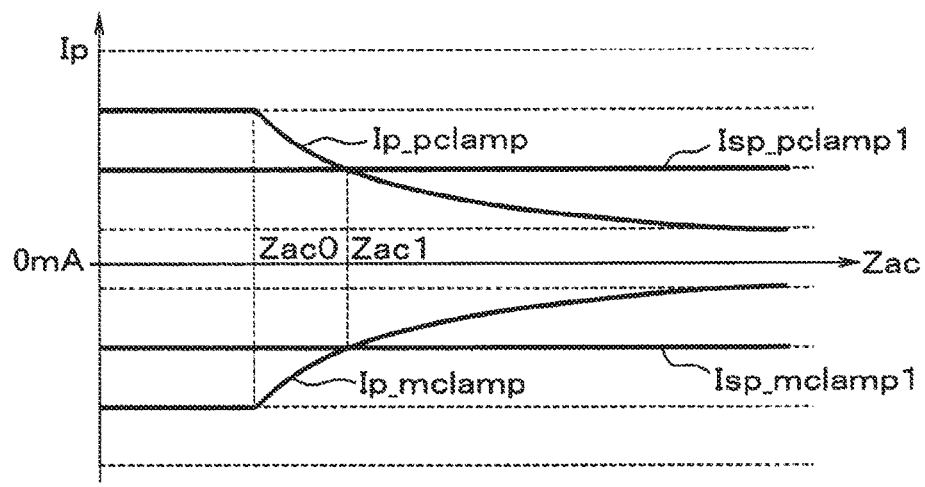
FIG. 9 is a graph illustrating the current limit value against the impedance of the second cell.

The second stage protection clamper 43 limits the first instruction current limit value Ip_clamp1 input from the first stage protection clamper 42, by comparing Ip_clamp1 with the upper limit value Isp_pclamp1 and the lower limit value Isp_mclamp1, and outputs the instruction current limit value Ip_clamp2 after limiting Ip_clamp2. These two input values, i.e., the upper limit value Isp_pclamp1 and the lower limit value Isp_mclamp1, are constant values, and the protection clamper 43 outputs the instruction current limit value Ip_clamp2 limited by such constant values. FIG. 9 illustrates a limiting function of the instruction current limit value Ip_clamp2 according to such constant value. As shown in FIG. 9, the current clamper 43 limits the instruction current limit Ip_clamp1 to be within a certain constant range, i.e., a range between the upper limit value Isp_pclamp1 and the lower limit value Isp_mclamp1, and outputs the limited current as the instruction current limit value Ip_clamp2.

That is, two stage protection clampers 42 and 43 are configured to (a) limit the instruction current value Ip_pid by the upper limit value Isp_pclamp1 and the lower limit value Isp_mclamp1, with reference to a certain predetermined impedance Zac1 (>Zac0), i.e., when the impedance Zac is lower than the predetermined impedance Zac1, and (b) limit the instruction current value Ip_pid by the upper limit value Ip_pclamp and the lower limit value Ip_mclamp when the impedance Zac is equal to or greater than the predetermined impedance Zac1.

<Explanation of the Current Voltage Converter 44>

Figure 10:
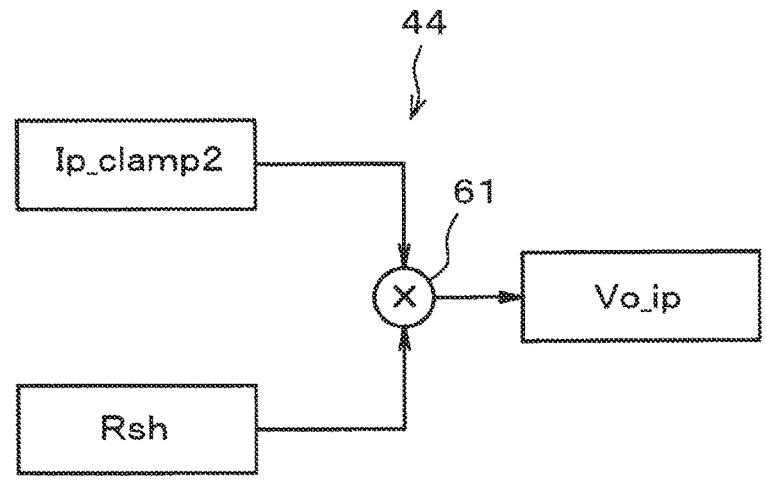
FIG. 10 is a block diagram of a configuration of a current voltage converter.
Figure 11:
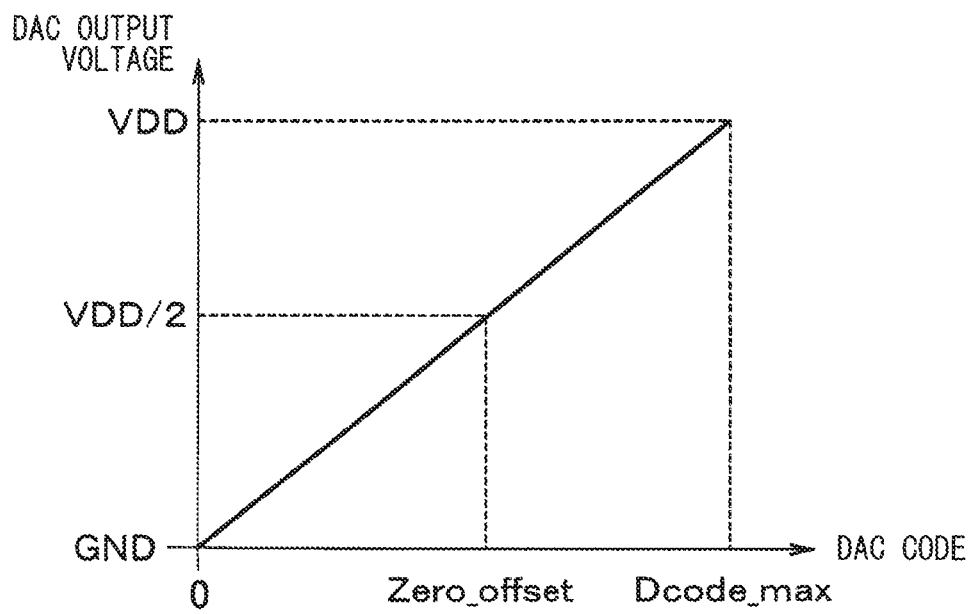
FIG. 11 is illustrates a relationship between a DAC code and an output voltage of a D/A converter.

The current voltage converter 44 shown in FIG. 5 operates as an instruction current voltage conversion section, which performs a current voltage conversion to convert the instruction current limit value Ip_clamp2 limited by the first and second stage protection clampers 42 and 43 to have an instruction voltage value Vo_ip, for example, and is configured as shown in FIG. 10. That is, the current voltage converter 44 is provided with a multiplier 61, as shown in the FIG. 10, and performs multiplication, i.e., multiplying the instruction current limit value Ip_clamp2 output from the protection clamper 43 by the resistance Rsh of the current sensing resistor 31, for calculating the instruction voltage value Vo_ip as a current voltage conversion value.

Note that the resistance Rsh of the current sensing resistor 31 may be determined (e.g., measured) in advance during the manufacture of the gas control device 1 or at an inspection time of the gas sensor control device 1. The measurement result of Rsh may be stored in a storage, such as a memory device (not illustrated). In such manner, variations of the resistance (i.e., measurement value Rsh described above) of the current sensing resistors 31 in each of the gas sensor control devices 1 may be highly accurately corrected/calibrated. That is, by storing the resistance Rsh in advance in a storage device, the calculation load of the internal calculation by the digital circuit part 14 can be simplified only to the multiplication, that is, the calculation load of the digital circuit part 14 can be reduced.

<Explanation of the DAC Code Converter 45>

The DAC code converter 45 shown in FIG. 5 converts a conversion voltage converted by the current voltage converter 44 to a DAC code VD that is suitable for output to the D/A converter 25, and outputs the DAC code VD to the D/A converter 25. By designating a DAC code VD with a DAC output voltage of VDD/2 (i.e., one half of VDD), which is the power source voltage of the D/A converter 25, as a zero offset Zero_offset, a maximum value of the DAC code VD as Dcode_max, and a minimum value of the DAC code VD as 0, the relationship between the DAC code VD and the DAC output voltage can be shown as the one in FIG. 11.

In addition, when the output of the current voltage converter 44 is designated as Vo_ip and a voltage of one least significant bit (LSB) of the D/A converter 25 is designated as Vdac_lsb, the DAC code converter 45 performs a conversion to a digital code VD according to the following equation (7), and outputs the digital code VD to the D/A converter 25.

$$VD = Vo\_ip/Vdac\_lsb + Zero\_offset \qquad \text{Equation (7)}$$

Figure 12:
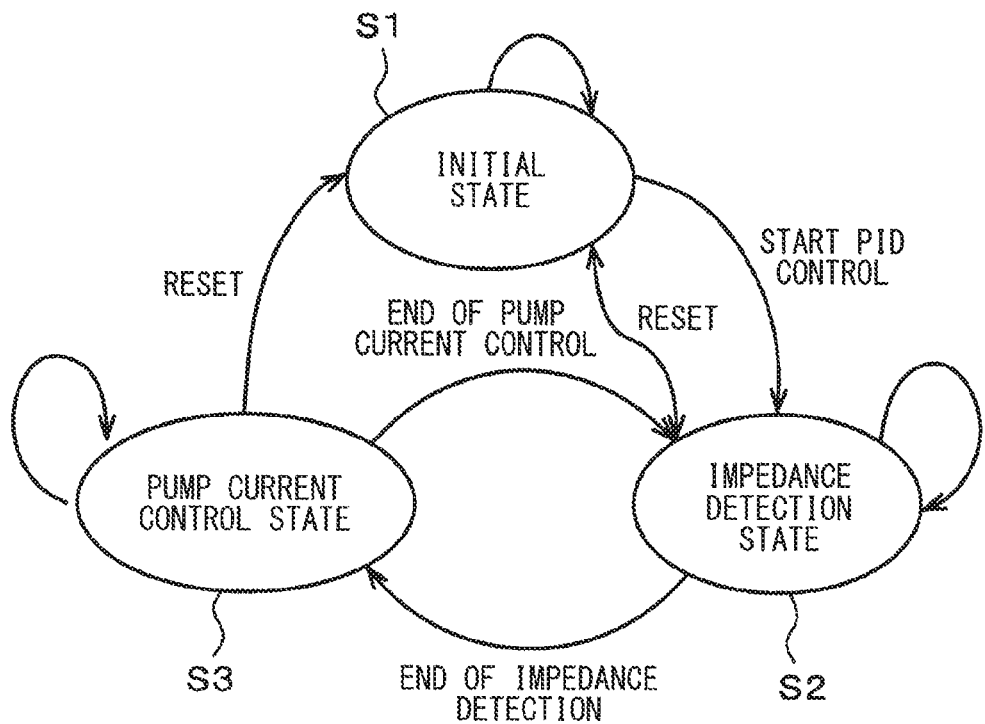
FIG. 12 is a state transition diagram of a control.

The characteristic operation of the basic configuration described above is described with reference to FIGS. 12 and 13. FIG. 12 is a state transition diagram of such control. The operation states include an initial state S1, an impedance detection state S2, and a pump current control state S3.

The initial state S1 is a state in which various kinds of initialization operations are performed, and the impedance detection state S2 is a state in which the impedance ZIp of the pump cell 3 is calculated by detecting the impedance Zac of the Nernst cell 4, and the pump current control state S3 is a state in which a control of the pump current Ip is performed.

In the initial state S1, when the integrity controller 16 generates a trigger to start a PID-control, S1 shifts to the impedance detection state S2. In the impedance detection state S2, the sweep current controller 18 applies the sweep current to the Nernst cell 4 via the D/A converter 26 and the voltage-controlled current source 28, the integrity controller 16 switches the switch 32 to receive the inter-terminal voltage Vs of the Nernst cell 4, and detects the impedance Zac of the Nernst cell 4 (i.e., the $t_{z\text{-}state}$ period shown in FIG. 13).

Then, after ending the detection of the impedance Zac by the impedance detector 20 under control of the integrity controller 16, S2 shifts to the pump current control state S3, and controls the pump current Ip by using the pump current controller 17. The pump current controller 17 performs PID calculation processing by using the PID calculator 41, then limits the instruction current value by using the first and second stage protection clampers 42 and 43, performs the current voltage conversion by using the current voltage converter 44, converts the voltage to the DAC code by using the DAC code converter 45, and then outputs the DAC code to the D/A converter 25 as a pump cell application control value (i.e., the $t_{ip\text{-}state}$ period shown in FIG. 13). In such manner, a pump current control by the pump current controller 17 is performed. After the end of the electric current control by the pump current controller 17, S3 shifts to the impedance detection state S2.

In such manner, the pump current controller 17 can apply a voltage to the terminals of the pump cell 3, while limiting the applied electric current to the pump cell 3. Then, as shown in FIG. 12, the impedance detection processing and the pump current control processing for the Nernst cell 4 are repeatedly performed.

Figure 13:
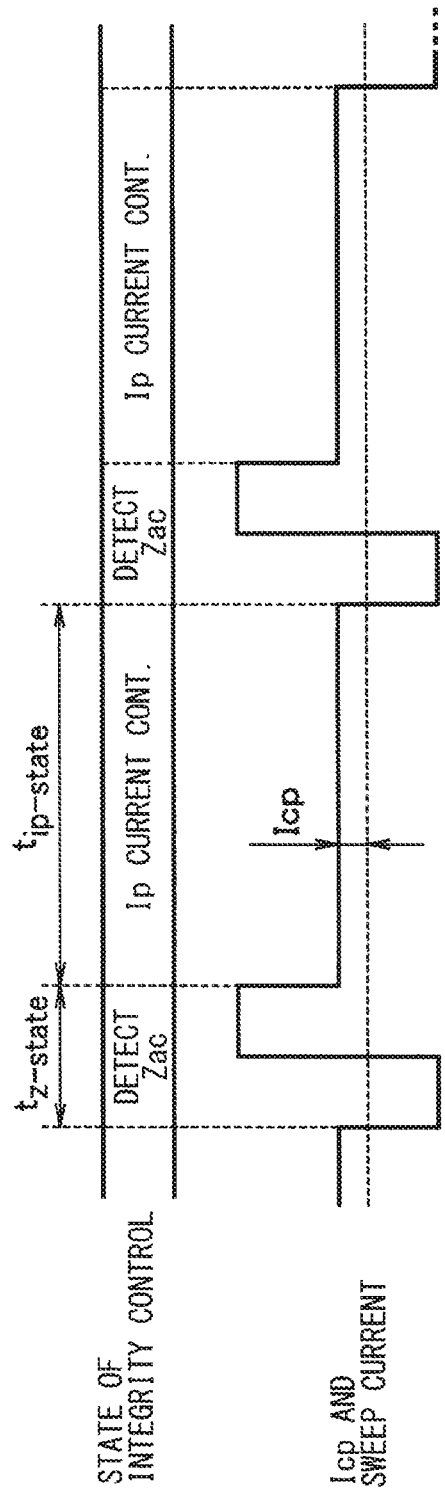
FIG. 13 is a timing chart for a control state showing a change of Icp and a sweep current.

Note that, the digital circuit part 14 in the impedance detection state S2 or in the pump current control state S3 of FIG. 13 shifts to the initial state S1 by performing a reset or reset processing of the integrity controller 16, to start the pump current control from scratch, i.e., to start the execution of the pump current control process from an initial setting.

<Conceptual Summary of the Present Embodiment>

In the present embodiment, the PID calculator 41 calculates the difference between an input of the Nernst control voltage (i.e., the PID control target value) and the detection value Vs of the inter-terminal voltage of the Nernst cell 4 and calculates the instruction value Ip_pid according to the calculated difference. The protection clampers 42 and 43 (i.e., the first cell current limiter) limit the supply of electric current to the pump cell 3 of the A/F sensor 2, based on (i) the instruction value Ip_pid calculated by the PID calculator 41 and (ii) the impedance Zac and ZIp respectively detected by the impedance detector 20.

Further, the current clamp threshold calculator 51 calculates the upper limit value Ip_pclamp and the lower limit value Ip_mclamp of the electric current based on the impedance Zac of the Nernst cell 4. The protection clamper 42 limits the instruction current value Ip_pid by the upper limit value Ip_pclamp and the lower limit value Ip_mclamp of the current clamp threshold calculator 51, and outputs the limited value as the first instruction current limit value Ip_clamp1. In such case, when such value is applied to the A/F sensor 2 that is activated at low impedance, since the limited value is insufficient, especially in the low impedance range, the present embodiment also includes a protection clamper 43.

The protection clamper 43 further performs a constant current limitation of the first instruction current limit value Ip_clamp1 by using the pump instruction constant current values Isp_pclamp1 and Isp_pclamp2. Therefore, even when the upper/lower limit values calculated by the current clamp threshold calculator 51 according to the types of the A/F sensor 2 are insufficient, the constant current limitation may be performed and/or imposed using the pump instruction constant current value to supply a constant current to the A/F sensor 2. Such a constant current limitation enables protection of the A/F sensor 2 during a time of normal operation, while also accommodating the control of various types of sensors.

At the time of performing such a constant current limitation, by assuming that the impedance Zac of the Nernst cell 4 is equal to the impedance ZIp of the pump cell 3, the protection clamper 42 limits the upper limit value Ip_pclamp and the lower limit value Ip_mclamp of the instruction current value Ip_pid respectively to the ones represented by the above-described equations (5) and (6). Thus, even when the absolute values of the limit values Ip_pclamp and Ip_mclamp take drastically large values in case that the impedance Zac of the Nernst cell 4 is in the low impedance range as shown by those equations (5) and (6), the constant current limitation is performable by the protection clamper 43 for limiting the application electric current to the A/F sensor 2, thereby sufficiently and reliably protecting the A/F sensor 2.

Further, since current voltage conversion processing is performable integrally by the current voltage converter 44, the number of calculation steps may be reduced.

Second Embodiment

Figure 14:
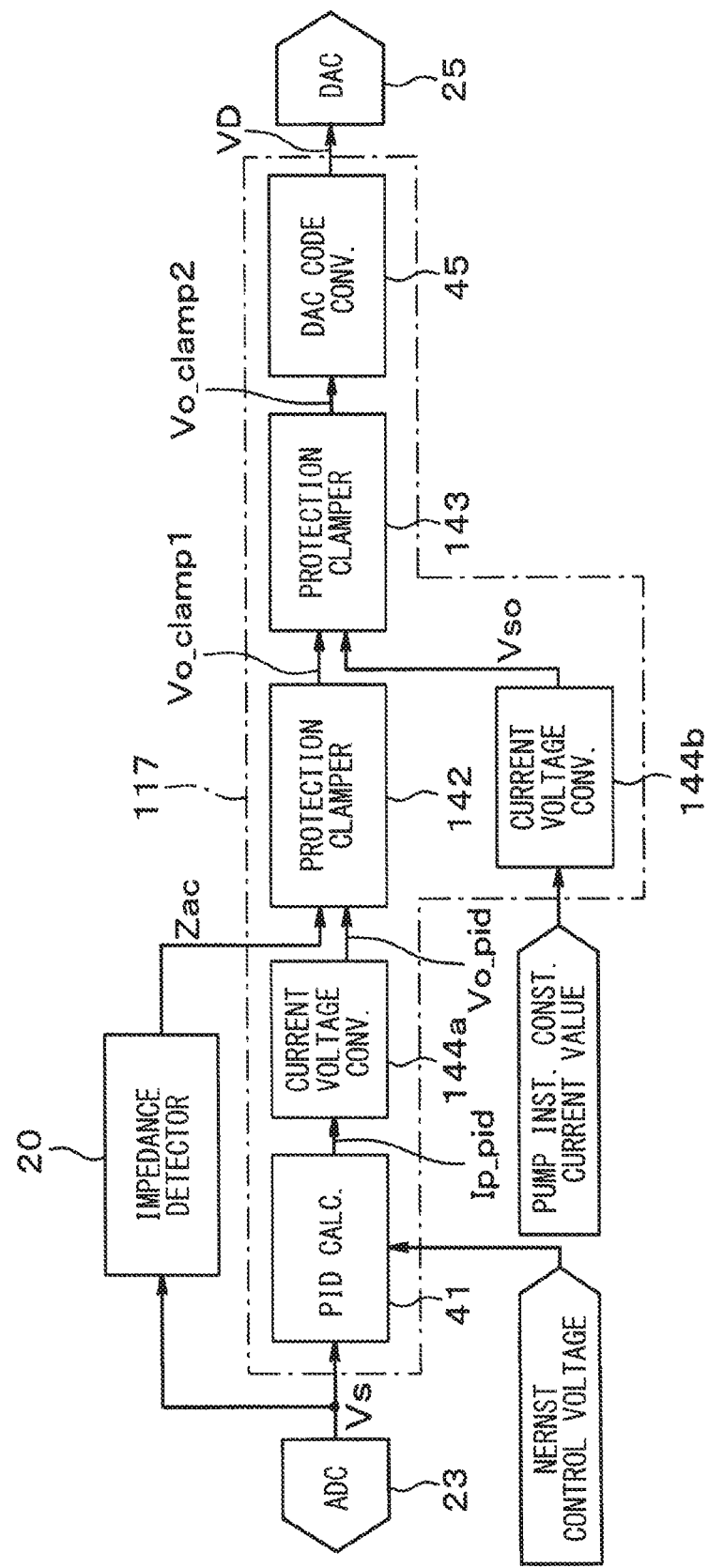
FIG. 14 is a block diagram of a pump current controller in a second embodiment of the present disclosure.
Figure 15:
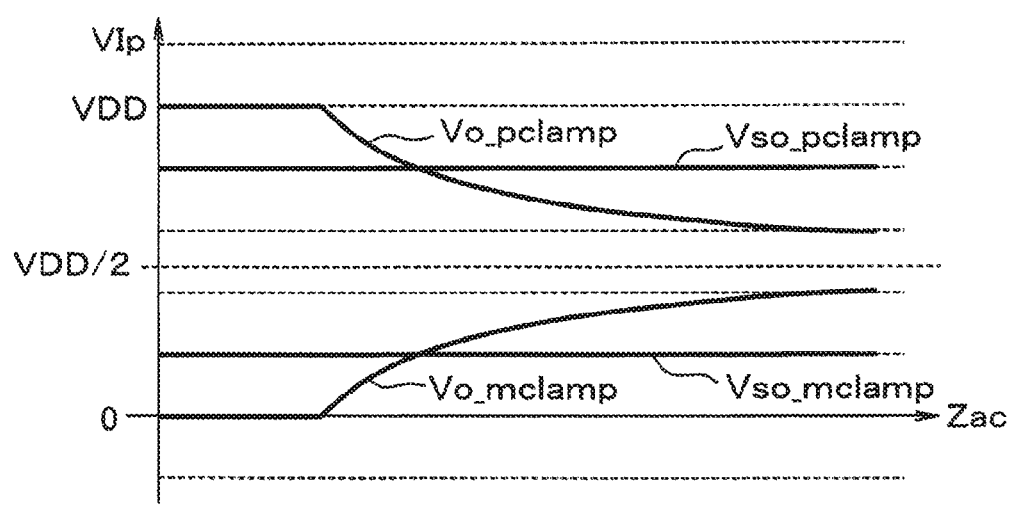
FIG. 15 is a graph illustrating a current limit value against an impedance of the second cell.
Figure 16:
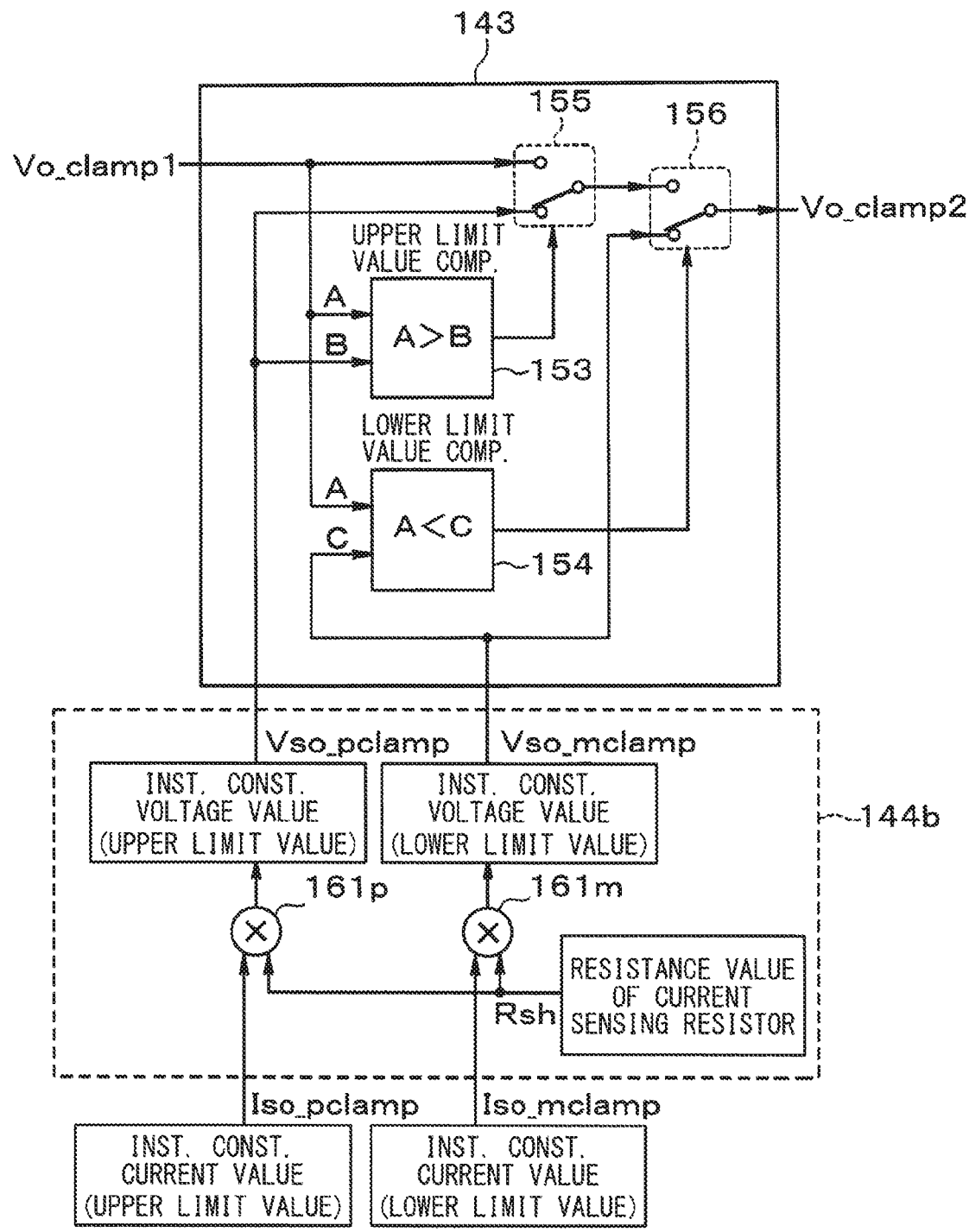
FIG. 16 is a block diagram of a configuration of a protection clamper.

FIGS. 14 to 16 show examples of the second embodiment of the present disclosure. The components having the functions are assigned with the same numerals as the preceding embodiments, or have the similar reference numerals such as a one "1" being affixed in front of the existing numerals. The description of such components focuses on the difference from the base components.

FIG. 14 shows an electric configuration block diagram of a pump current controller 117, which replaces the pump current controller 17 of the first embodiment. As shown in FIG. 14, the pump current controller 117 is provided with the impedance detector 20, the PID calculator 41, protection clampers 142 and 143, current voltage converters 144a and 144b, and the DAC code converter 45. The protection clampers 142, 143 are used as a cell application voltage limiter.

Just like the first embodiment, the PID calculator 41 in the present embodiment receives an input of an instruction value, performs PID calculation processing based on the detected voltage Vs of the Nernst cell 4, and outputs the Nernst control voltage to the current voltage converter 144a as the instruction current value Ip_pid. The current voltage converter 144a performs a current voltage conversion of the instruction current value Ip_pid, and outputs a conversion voltage Vo_pid to the protection clamper 142.

<Explanation of the Protection Clamper 142 (i.e., a Conversion Voltage Value Limiter)>

The protection clamper 142 is provided with a function of a conversion voltage value limiter, and limits the converted instruction voltage value. The voltage limit processing is performed based on the following equation (8), which assumes that the impedance ZIp of the equation (3) is equal to the impedance Zac.

$$VIp = ((0.5 \times VDD - Vo)/Rsh + \Delta I) \times Zac \qquad \text{Equation (8)}$$

In the equation (8), the voltage VIp is limited to be within the range of the following equation (9).

$$-Vclamp \le VIp + Vclamp \qquad \text{Equation (9)}$$

At the time of such limitation, the following equations (10) and (11) are used to represent the upper limit Vo_pclamp and the lower limit Vo_mclamp of the output voltage Vo of the operational amplifier, respectively.

$$Vo\_pclamp = 0.5 \times VDD - \Delta I \times Rsh + Vclamp \times Rsh/Zac \qquad \text{Equation (10)}$$

$$Vo\_mclamp = 0.5 \times VDD + \Delta I \times Rsh + Vclamp \times Rsh/Zac \qquad \text{Equation (11)}$$

Thus, the protection clamper 142 can limit the application voltage VIp to the pump cell 3 by the upper limit Vo_pclamp and the lower limit Vo_mclamp based on the impedance Zac. These limit values are set respectively as a value based on the impedance Zac of the Nernst cell 4 of the sensor 2, i.e., as Vso_pclamp and Vso_mclamp in FIG. 15. Note that, in the present embodiment, the power supply of VDD is used as a single power supply for the operational amplifiers 21 and 22, the protection clamper 142 sets an upper limit to VDD, when the upper limit exceeds VDD, and sets a lower limit to 0V when the lower limit falls below 0V, for performing the voltage limitation. The protection clamper 142 sets, as a first instruction voltage limit value Vo_clamp1, a voltage value by the voltage limitation based on the equations (10) and (11), and outputs the limited voltage value to the protection clamper 143.

<Explanation of the Current Voltage Converter 144b and the Protection Clamper 143 (an Instruction Constant Voltage Limiter)>

The A/F sensor 2 may be activated at a low impedance or may be activated at a high impedance, depending on the sensor types. That is, the voltage limitation value only by the protection clamper 142 in a low impedance range may be insufficient. Therefore, in the present embodiment, the protection clamper 143 is provided for performing a constant voltage limitation in the latter stage of the protection clamper 142.

The pump current controller 117 receives an input of a pump instruction constant current value just like the first embodiment, and the pump instruction constant current value is then input to the current voltage converter 144b. The current voltage converter 144b performs a current voltage conversion of the instruction constant current value Iso (i.e., an upper limit value Iso_pclamp and a lower limit value Iso_mclamp) based on such input, and outputs to the second stage protection clamper 143 an instruction constant voltage value Vso (i.e., an upper limit value Vso_pclamp and a lower limit value Vso_mclamp).

The current voltage converter 144b functions as a constant current voltage converter, and it is configured as shown in FIG. 16. That is, the current voltage converter 144b multiplies the instruction constant current value Iso (i.e., the upper limit value Iso_pclamp and the lower limit value Iso_mclamp, respectively) by the resistance Rsh of the current sensing resistor 31 by using multipliers 161p and 161m, as shown in FIG. 16, and converts Iso to the instruction constant voltage value Vso (i.e., the upper limit value Vso_pclamp and the lower limit value Vso_mclamp).

The second stage protection clamper 143 shown in FIG. 14 limits the instruction voltage limit value Vo_clamp1 converted by the first stage protection clamper 142 by using the instruction constant voltage value Vso of the current voltage converter 144b, and outputs the limited value to the DAC code converter 45.

The second stage protection clamper 143 shown in FIG. 16 includes an upper limit comparator 153, a lower limit comparators 154, and switches 155 and 156. The upper limit comparator 153 compares (i) the instruction voltage limit value Vo_clamp1 converted by the first stage protection clamper 142 and (ii) the upper limit value Vso_pclamp of the instruction constant voltage value Vso. The lower limit comparator 154 compares (i) the instruction voltage limit value Vo_clamp1 and (ii) the lower limit value Vso_mclamp of the instruction constant voltage value Vso. The switches 155 and 156 respectively switch their outputs according to the outputs of the upper limit comparator 153 and the lower limit comparator 154.

The upper limit comparator 153 switches the switch 155 so that the instruction voltage limit value Vo_clamp1 converted by the first stage protection clamper 142, when exceeding the upper limit value Vso_pclamp, is limited to the upper limit value Vso_pclamp, and outputs the limited value as an instruction voltage limit value Vo_clamp2. Further, the lower limit comparator 154 switches switch 156 so that the instruction voltage limit value Vo_clamp1 converted by the protection clamper 142 in the former stage, when falling below the lower limit value Vso_mclamp, is limited to the lower limit value Vso_mclamp, and outputs the limited value as the instruction voltage limit value Vo_clamp2. Thereby, the protection clamper 143 is capable of limiting the instruction voltage limit value Vo_clamp1 by using the instruction constant voltage value Vso, and outputs the limited value as the instruction voltage limit value Vo_clamp2.

The DAC code converter 45 shown in FIG. 14 converts the instruction voltage limit value Vo_clamp2 to the DAC code, and outputs the converted value to the D/A converter 25. In such manner, the protection clampers 142 and 143 can perform two stages of limitation processing, and, even when the voltage limit processing by the protection clamper 142 is insufficient, the protection clamper 143 limits the application voltage that is going to be applied to the pump cell 3 as the pump instruction constant current value, thereby enabling protection of the A/F sensor 2.

<Conceptual Summary of the Present Embodiment>

As described above, according to the present embodiment, the protection clamper 142 limits the instruction voltage value converted by the current voltage converter 144a based on the impedance Zac that is detected by the impedance detector 20, and sets the limited instruction voltage value as the first instruction voltage limit value Vo_clamp1. The current voltage converter 144b converts an input of the constant current instruction value to the instruction constant voltage value Vso by performing a current voltage conversion. The instruction constant voltage limiter 143 limits the first instruction voltage limit value Vo_clamp1 limited by the protection clamper 142 by the instruction constant voltage value Vso of the current voltage converter 144b and sets the limited instruction voltage value as the second instruction voltage limit value Vo_clamp2. In such manner, the same operation effects as the first embodiment are achieved.

Third Embodiment

Figure 17:
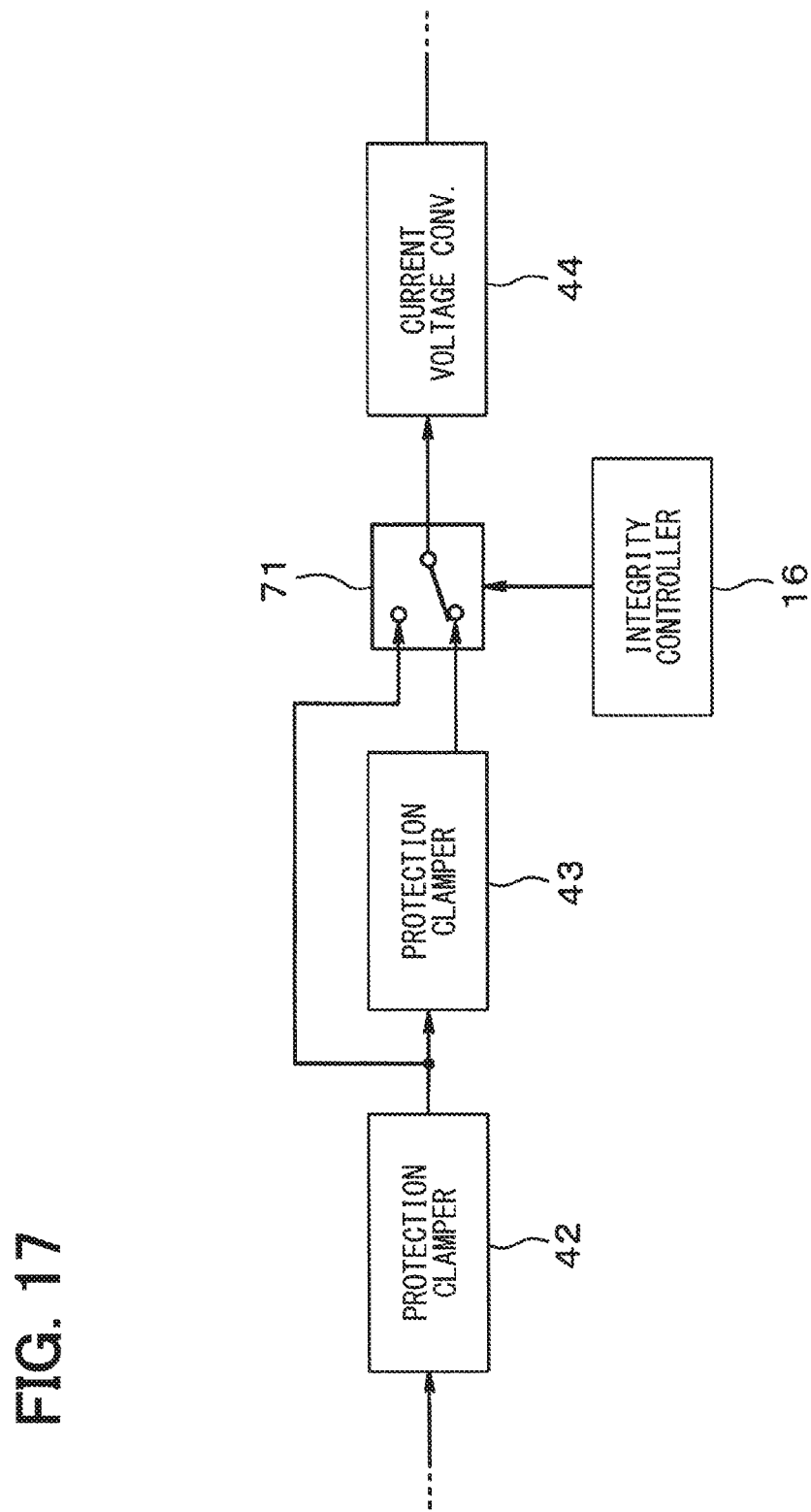
FIG. 17 is a block diagram of a configuration of a part of a pump current controller in a third embodiment of the present disclosure.
Figure 18:
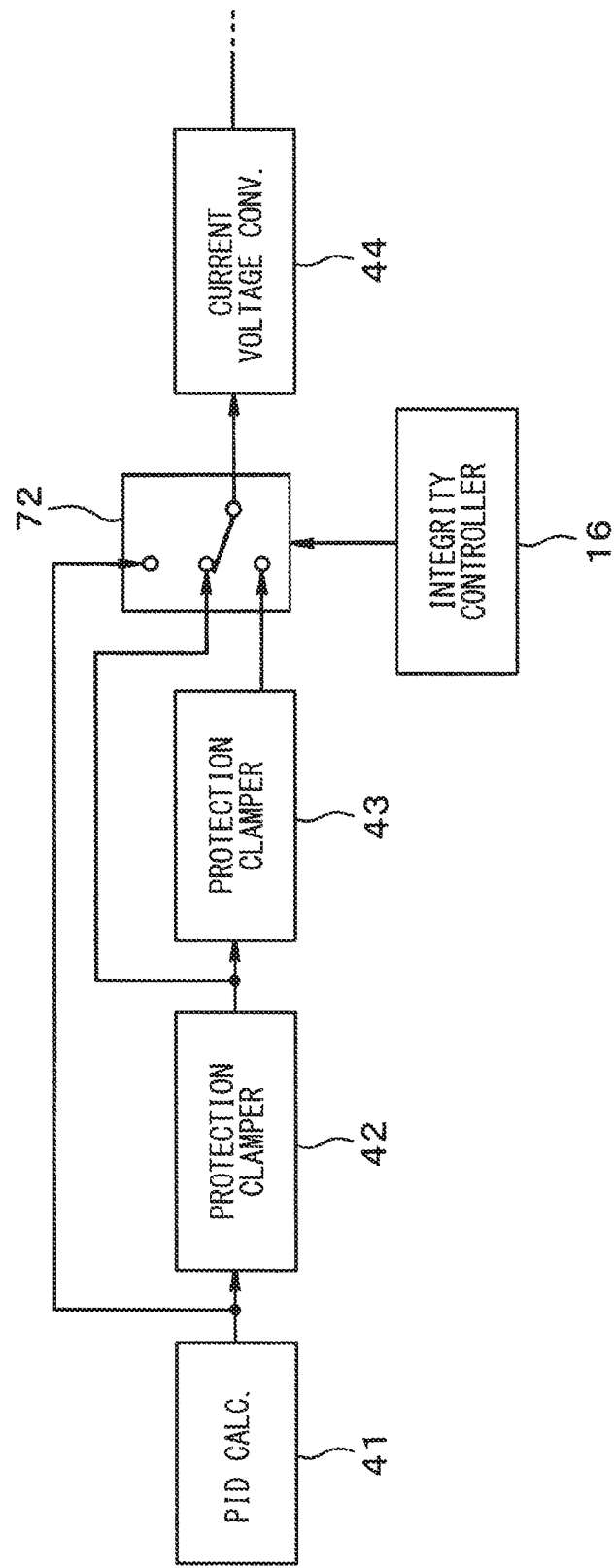
FIG. 18 is a block diagram of a configuration of a part of the pump current controller in a modification of the third embodiment of the present disclosure.

FIGS. 17 and 18 show examples of the third embodiment of the present disclosure. The components having the same functions are assigned with the same numerals as the preceding embodiments, and the description of such components focuses on the difference from the base components.

Although the protection clampers 42 and 43 are cascade-connected for providing protection in the first embodiment, the function of the protection clamper 43 may be validated and invalidated by switching the output of a switch.

FIG. 17 shows an example of such a configuration. The protection clampers 42 and 43 are configured to have a cascaded connection, a first switcher 71 (i.e., switch) is provided as a separate component at a position between the protection clamper 43 and the current voltage converter 44. The first switcher 71 is configured to select one of the output of the protection clamper 42 and the output of the protection clamper 43, according to a valid-invalid switching control signal (i.e., a flag) from the integrity controller 16. That is, the function of the protection clamper 43 may be validated and invalidated by switching the output of the first switcher 71.

When the first switcher 71 makes a switch selection to select the output of the protection clamper 42, the current voltage converter 44 performs a current voltage conversion processing of the first instruction current limit value Ip_clamp1 output by the protection clamper 42, and outputs the converted value to the DAC code converter 45. In such a case, an instruction of the pump instruction constant current value (i.e., an input to the protection clamper 43) is invalidated, and accordingly, the output of the protection clamper 43 is also invalidated. On the other hand, when the first switcher 71 switches to select the output of the protection clamper 43, the instructions for the pump instruction constant current value (i.e., the input to the protection clamper 43) is validated, and thus the output of the protection clamper 43 is also validated.

Another example modification may be, as shown in FIG. 18, a switcher 72 (i.e., a second switcher), which selectively switches the output from among an output of the PID calculator 41, an output of the protection clamper 42, and an output of the protection clamper 43, to receive one of them as an input from those components. That is, the output to the current voltage converter 44 is selected from among the three inputs from those components. The switcher 72 selects one of the three inputs from among the output of the PID calculator 41, the output of the protection clamper 42, and the output of the protection clamper 43 according to the valid-invalid switching control signal from the integrity controller 16, thereby capable of invalidating (i) the function of the protection clamper 43 or (ii) the function of both of the protection clampers 42 and 43. In such manner, the output of the PID calculator 41 is selected and is directly output to the current voltage converter 44, while invalidating both of (a) the impedance dependent limitation based on the impedance Zac and (b) an instruction of the pump instruction current value input to the clamper 43.

Fourth Embodiment

Figure 19:
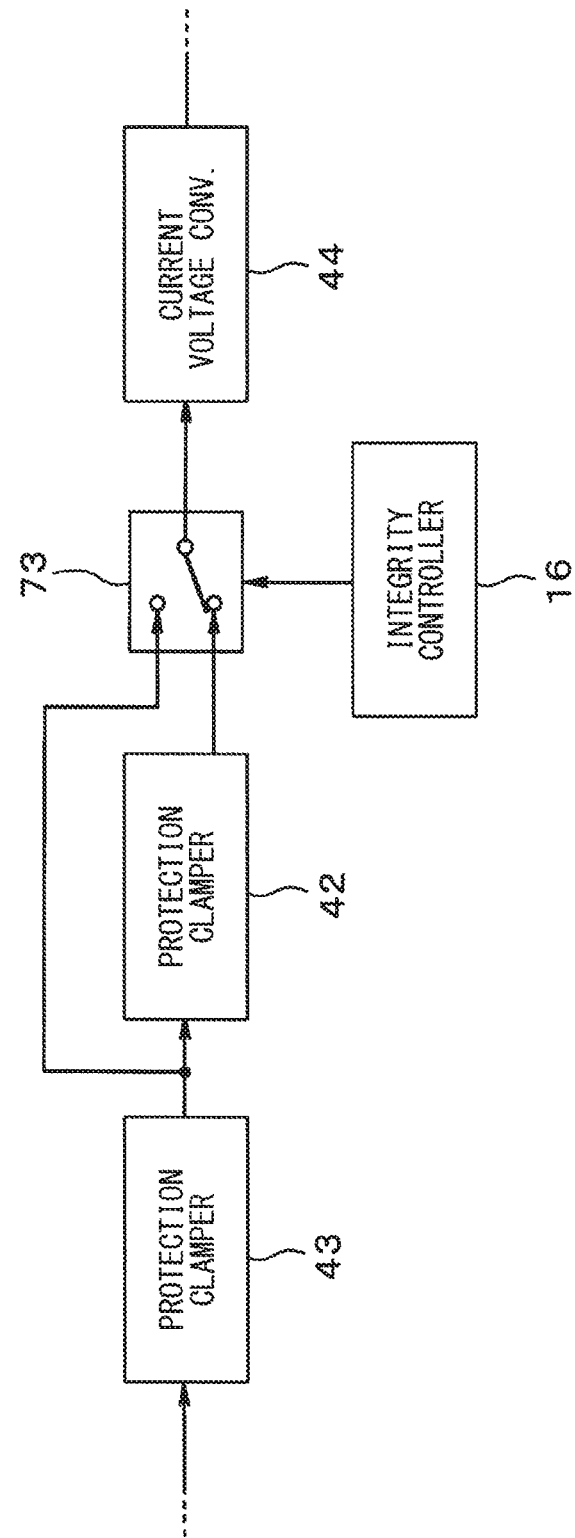
FIG. 19 is a block diagram of a configuration of a part of a pump current controller in a fourth embodiment of the present disclosure.

FIG. 19 shows another explanatory view in the fourth embodiment of the present disclosure. The components having the same functions are assigned with the same numerals as the preceding embodiment, and the description of such components focuses on the difference from the base components.

In the first embodiment, after the limitation by the protection clamper 42 for limiting the instruction current value Ip_pid by using the upper limit value Ip_pclamp and the lower limit value Ip_mclamp and setting it as the first instruction current limit value Ip_clamp1, the protection clamper 43 limits the first instruction current limit value Ip_clamp1 by the pump instruction constant current value (i.e., the upper limit value Isp_pclamp1 and the lower limit value Isp_mclamp1), and outputs the instruction current limit value Ip_clamp2. However, the order of such limitations may be reversed.

FIG. 19 shows a configuration example. The cascaded connection of the protection clampers 43 and 42 is made in the present embodiment in the order illustrated in FIG. 19, that is, the protection clamper 43 precedes the protection clamper 42. Based on such configuration, after the limitation by the protection clamper 43 for (i) limiting the instruction current value Ip_pid with the pump instruction constant current value (i.e., the upper limit value Isp_pclamp1 and the lower limit value Isp_mclamp1) and (ii) outputting the limited value as the second instruction current limit value Ip_clamp2, the protection clamper 42 limits the second instruction current limit value Ip_clamp2 by using the upper limit value Ip_pclamp and the lower limit value Ip_mclamp, and outputs the limited value to the current voltage converter 44. The protection method described above also achieves the same operation effects as the first embodiment.

Further, as shown in FIG. 19, a switcher 73 (an example of a second switcher) may be provided, for selectively switching the output of the protection clamper 42 and the output of the protection clamper 43 according to the valid-invalid switching control signal from the integrity controller 16. That is, the switcher 73 can invalidate the function of the protection clamper 42.

When the switcher 73 selects the output of the protection clamper 43, the current voltage converter 44 performs a current voltage conversion processing of the second instruction current limit value Ip_clamp2 that is output by the protection clamper 43, and outputs the converted value to the DAC code converter 45. In such case, the current limit processing based on the impedance Zac may be invalidated.

Other Embodiments

The present disclosure is not necessarily limited to the embodiments described above, and further modifications of the above-described embodiments may be possible.

The number of bits processed by the A/D converter 23 and the D/A converters 25, 26, may be arbitrarily set by a design of individual devices/systems. Although a comparison object reference voltage used by the operational amplifier 21 is described as 0.5×VDD above, the reference voltage may be arbitrarily changed. Although the PID calculation processing is described above, a PI control or a PD control may be performed. Each of the above-mentioned embodiments may be combinable with one or more of the other embodiments.

Although the components of the digital circuit part 14 described above are described as being internal to the digital circuit part 14, the components, as a whole or in part, may be provided separately from (i.e., as outside components external to) the digital circuit part 14.

In terms of an application to a gas sensor, the present disclosure may be applicable to a nitrogen oxide (NOx) sensor having a sensor cell and a monitor cell, other than the air-fuel ratio (A/F) sensor 2. Further, although the above-described embodiments describe an application to the sensor 2 of a two-cell type provided with the pump cell 3 and the Nernst cell 4, the present disclosure may be applicable to a gas sensor with three or more cells, such as the one having a pump cell, a sensor cell, and a monitor cell for respectively performing a function of (i) discharging oxygen to an outside of the measurement chamber where the exhaust gas of an internal combustion engine is introduced, (ii) detecting, after discharging the oxygen from the exhaust gas, a density of residual oxygen in the exhaust gas and a density of a specific gas in the exhaust gas (e.g., NOx), and (iii) detecting, after discharging the oxygen from the exhaust gas, a density of residual oxygen in the exhaust gas.

Although the present disclosure is described based on the embodiments described above, it is understood that the disclosure is not limited to those embodiments and structures. The present disclosure may include various changes and modifications within a scope of equivalents, based on those embodiments.

What is claimed is:

1. A gas sensor controller for controlling a gas sensor that includes a first cell for substantively detecting a state of a gas in an exhaust gas of an internal-combustion engine, and a second cell electrically connected to the first cell, the gas sensor controller comprising:
 an impedance detector configured to detect an impedance of the gas sensor that detects the state of the gas in the exhaust gas of the internal-combustion engine; and
 a current supply controller configured to perform a digital control on a supply of electric current to the gas sensor, wherein
 the current supply controller includes:
  a calculator configured to calculate a difference between a control target value and a detection value of an inter-terminal voltage of the second cell, and an instruction current value according to the calculated difference; and
  a first cell current limiter configured to limit a supply of electric current to the first cell of the gas sensor based on the instruction current value calculated by the calculator and the impedance detected by the impedance detector, the first cell current limiter including:
   a current clamp threshold calculator configured to calculate an upper limit value and a lower limit value of the electric current based on the impedance of the second cell, and
   a current value limiter configured to
    limit the instruction current value calculated by the calculator by using the upper/lower limit values calculated by the current clamp threshold calculator,
    perform a constant current limitation on the limited instruction current value by using an instruction constant current value, and
    limit the limited instruction current value by using the upper/lower limit values calculated by the current clamp threshold calculator,
   wherein the current value limiter includes:
    a first current value limiter configured to limit the instruction current value calculated by the calculator by using the upper limit value and the lower limit value of the current clamp threshold calculator to set a first instruction current limit value; and
    a second current value limiter configured to perform the constant current limitation to limit the first instruction current limit value by using the instruction constant current value.

2. The gas sensor controller of claim 1, wherein the current supply controller further includes
 a first switcher configured to validate and invalidate a function of the second current value limiter by switching an output of the first switcher.

3. The gas sensor controller of claim 2, wherein
 the current value limiter is further configured to limit the supply of electric current to the first cell of the gas sensor by the first instruction current limit value when the first switcher invalidates the function of the second current value limiter, after limiting the instruction current value calculated by the calculator to the first instruction current limit value by using the upper limit value and the lower limit value of the current clamp threshold calculator.

4. The gas sensor controller of claim 1, wherein the current supply controller further includes a second switcher configured to validate and invalidate a function of the first current value limiter by switching an output of the second switcher.

5. The gas sensor controller of claim 4, wherein
 the current value limiter is further configured to limit the supply of electric current to the first cell of the gas sensor by the instruction current limit value when the second switcher invalidates the function of the first current value limiter, after limiting the instruction current value calculated by the calculator to the instruction current limit value by using the instruction constant current value.

6. The gas sensor controller of claim 1, wherein
 by designating an impedance of the first cell as ZIp, an impedance of the second cell as Zac, a supply of electric current to the first cell as Ip, a current flowing through a series circuit by series connection of the first cell and the second cell as $\Delta I$, and an upper limit value and a lower limit value of a limit voltage range of an application voltage to the first cell respectively as +Vclamp and −Vclamp, the first current value limiter is further configured to set an upper limit value Ip_pclamp and a lower limit value Ip_mclamp for limiting the instruction current value respectively as $$Ip\_p\text{clamp} = +V\text{clamp}/Zac - \Delta I$$

$$Ip\_m\text{clamp} = -V\text{clamp}/Zac - \Delta I$$

based on an assumption that the impedance Zac of the second cell is equal to the impedance ZIp of the first cell.

7. The gas sensor controller of claim 1, wherein the current supply controller further includes
 a current voltage converter configured to perform a current voltage conversion on the current value that is derived by performing the constant current limitation by the current value limiter.

8. A gas sensor controller for controlling a gas sensor that includes a first cell for substantively detecting a state of a gas in an exhaust gas of an internal-combustion engine, and a second cell electrically connected to the first cell, the gas sensor controller comprising:
 an impedance detector configured to detect an impedance of the gas sensor that detects the state of the gas in the exhaust gas of the internal-combustion engine; and
 a current supply controller configured to perform a digital control on a supply of electric current to the gas sensor, wherein
 the current supply controller includes:
  a calculator configured to calculate a difference between a control target value and a detection value of an inter-terminal voltage of the second cell and an instruction current value according to the calculated difference;
  an instruction current voltage converter configured to perform a current voltage conversion on the instruction current value to set an instruction voltage value; and
  a cell application voltage limiter configured to limit an application voltage to the first cell of the gas sensor based on the instruction voltage value and the impedance detected by the impedance detector, the cell application voltage limiter including:
   a conversion voltage limiter configured to set a first instruction voltage limit value by limiting the instruction voltage value that is derived by the conversion by the instruction current voltage converter based on the impedance detected by the impedance detector;
a constant current voltage converter configured to output an instruction constant voltage value by performing a current voltage conversion on an input of a constant current instruction value; and
an instruction constant voltage limiter configured to further limit the first instruction voltage limit value limited by the conversion voltage value limiter by using the instruction constant voltage value of the constant current voltage converter to output a second instruction voltage limit value.

* * * * *